United States Patent Office 3,253,734
Patented May 31, 1966

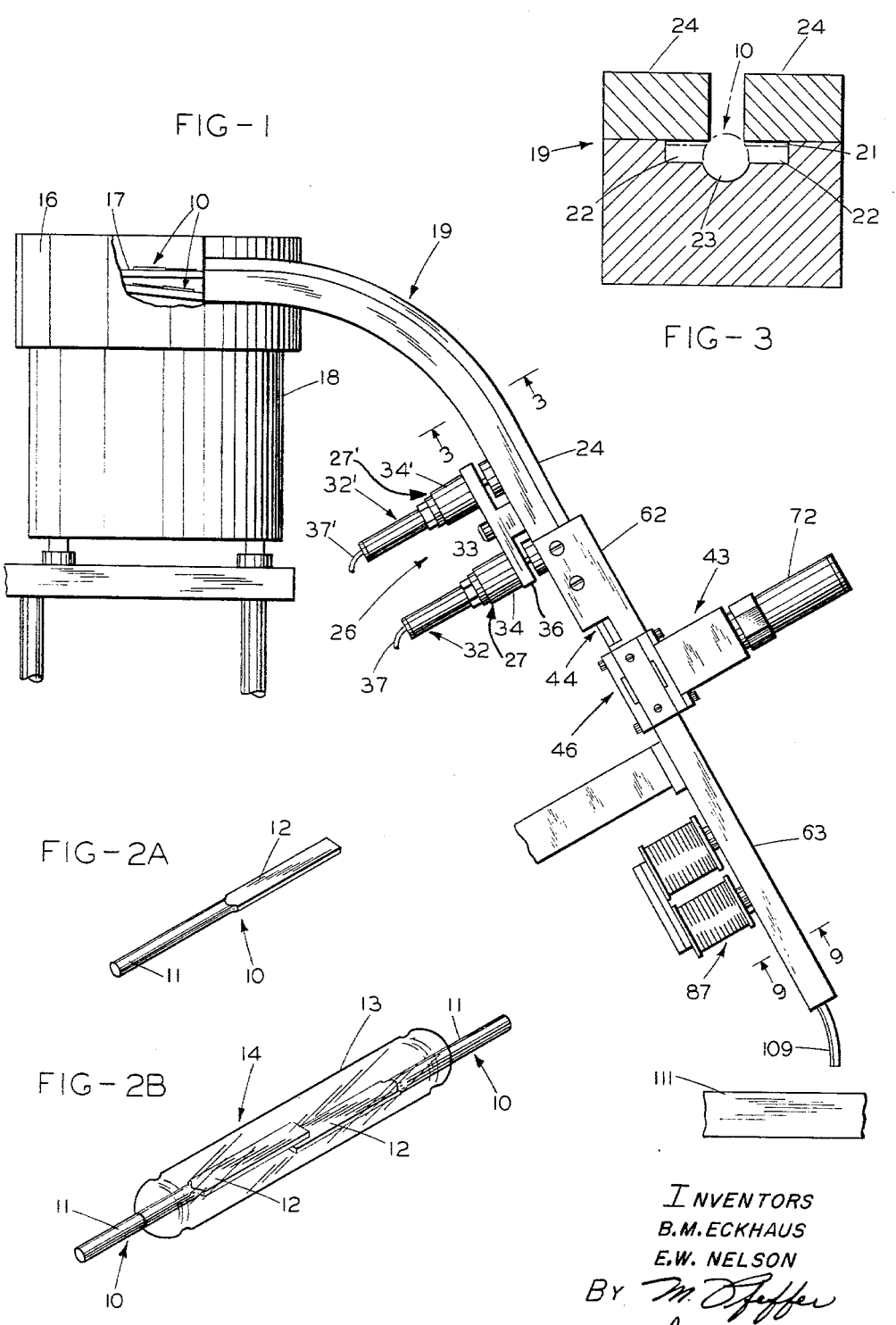

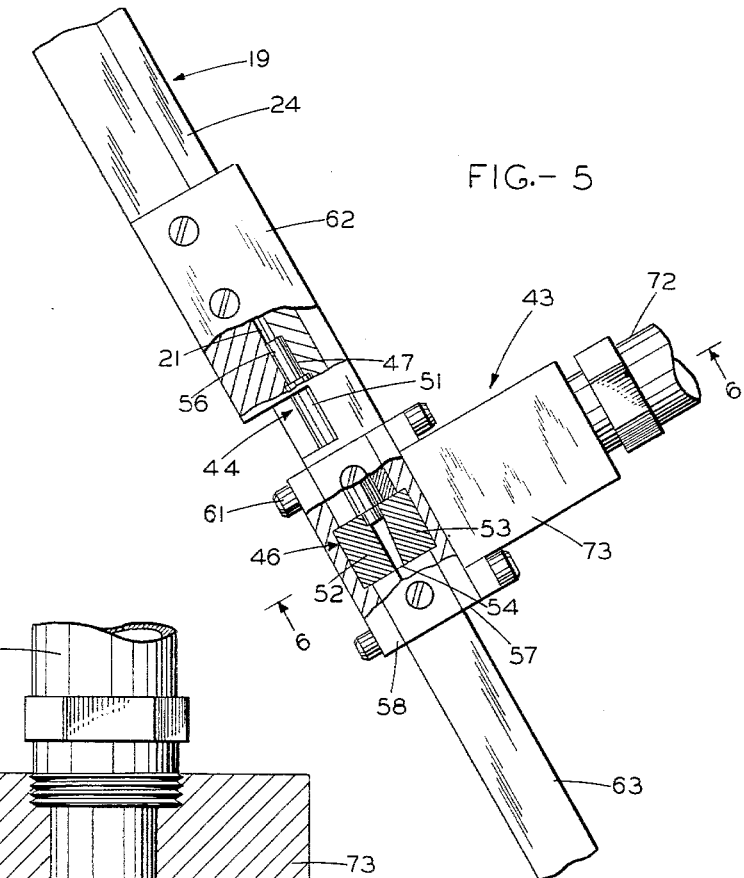
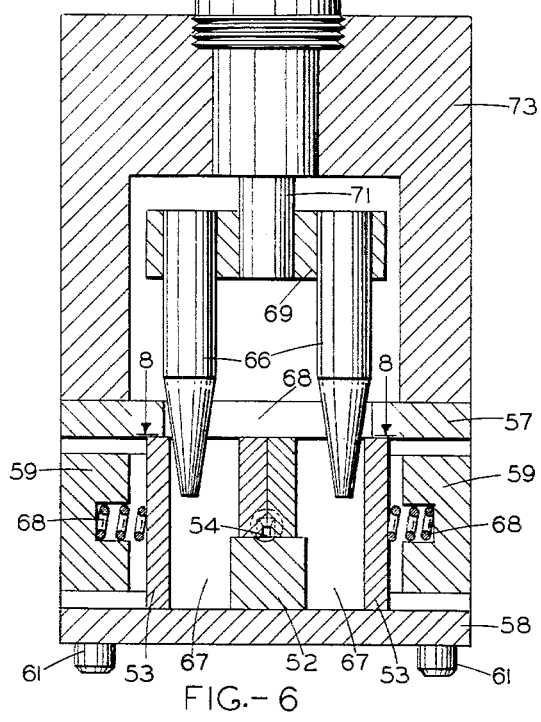
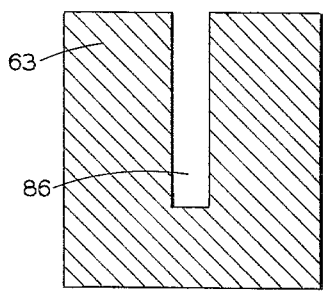
FIG.-5
FIG.-6
FIG.-9

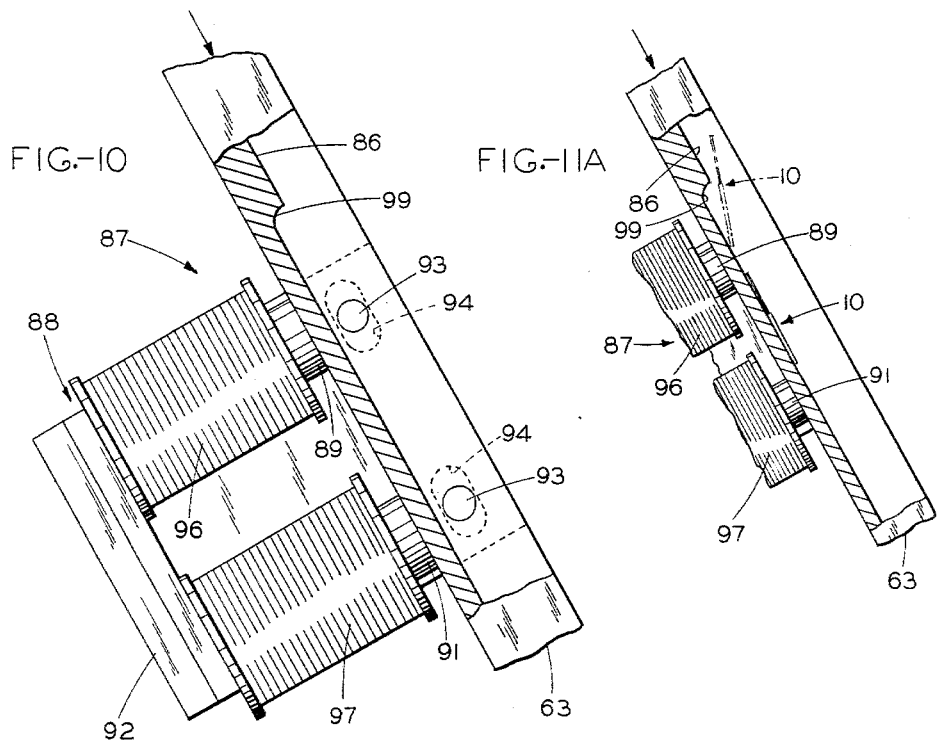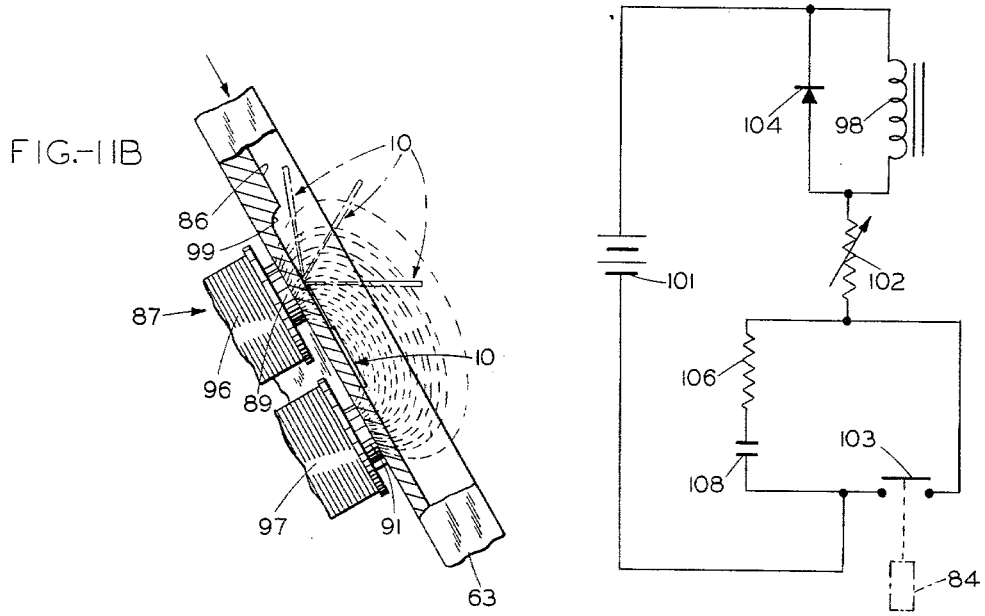

3,253,734
METHODS OF AND APPARATUS FOR DETECTING DIMENSIONAL CHARACTERISTICS OF ARTICLES
Barry M. Eckhaus, Easton, and Eric W. Nelson, Allentown, Pa., assignors to Western Electric Company, Incorporated, New York, N.Y., a corporation of New York
Filed Feb. 8, 1965, Ser. No. 430,958
14 Claims. (Cl. 221—1)

This invention relates generally to methods of and apparatus for detecting certain dimensional characteristics of articles. More particularly, this invention relates to methods of and apparatus for detecting the orientation of an advancing article having asymmetrically shaped ends, and for orienting those articles which are detected to be in an undesirable orientation. Accordingly, the general objects of this invention are to provide new and improved methods and apparatus of such a character.

In the manufacture of sealed contacts for use in ferrled switches, two metallic contacts are assembled in parallel, overlapping relationship, and are then sealed within a glass envelope. Each of the contacts is composed of a paramagnetic material and has a round end and a flat end. In order to facilitate the mass production of the sealed contacts, it is first necessary to arrange the individual contacts in an oriented manner compatible with such type production. One way this may be accomplished is to deposit a randomly arranged supply of the contacts in a vibratory feeding bowl which advances them, single file, to a track, and then to orient the contacts such that their like ends face in the same direction. Before the contacts can be so oriented, it is first necessary to determine their initial orientations. This requires a determination of which end of each contact, i.e., the round end or the flat end, is leading.

It is, therefore, another object of this invention to provide new and improved methods of and apparatus for detecting the orientation of advancing paramagnetic articles having asymmetrically shaped ends.

Another object of the invention is to provide continuous automatic equipment of a relatively simple nature for detecting the orientation of each such article and reversing those which are detected to be in an undesirable orientation.

With the foregoing and other objects in view, the present invention, in one aspect, is directed to detecting a transverse dimension of an advancing article at a reference distance from the leading end thereof. The dimension may have either of two different values depending upon the shape and orientation of the advancing article. The article is advanced to an electrical unit having an opening large enough to receive at least a portion of the article if the transverse dimension thereof has one of the possible values to be detected. The electrical unit is of a type (having regard to the material of which the article is made) such that an electrical parameter thereof is altered depending on the amount of the article which is within the opening. A mechanism is provided for halting the advancement of the article in a position such that, if the transverse dimension of the article has a first one of the possible values, the article stops in a position with at least a portion of the article in the opening and the electrical parameter accordingly assumes a first value. Conversely, if the transverse dimension of the article has the other one of the possible values, the article stops in a different position and the electrical parameter assumes a different value. A circuit, responsive to the value of the parameter of the electrical unit, is provided for generating a signal in accordance with the detected dimensional value of the article.

In another aspect the invention is directed to detecting the orientation of an advancing paramagnetic article having asymmetrically shaped ends, and to orienting those articles detected to be in an undesirable orientation. In this instance, the electrical unit includes an electrical coil, the inductance of which is altered depending upon the amount of the article within the coil. If one end of the article is leading, the article is halted in a position such that a substantial part thereof is within the coil, and if the other end of the article is leading the article is halted in a position such that no part or a relatively small part thereof is within the coil. A signal is then generated in accordance with the inductance of the coil to indicate the orientation of the halted article, i.e., which end thereof is leading. The article is then advanced to a suitable orienter which either reverses the orientation of the article or allows the article to pass in its initial orientation in accordance with the generated signal.

Other objects, advantages and features of the invention will be apparent from the following detailed description of a specific embodiment thereof, when read in conjunction with the appended drawings, in which:

FIG. 1 is an elevation view of apparatus embodying certain principles of the invention for orienting elongated paramagnetic articles having asymmetrically shaped ends;

FIG. 2A is a perspective view of a paramagnetic contact having asymmetrically shaped ends which may be oriented with the apparatus of FIG. 1, and FIG. 2B is a perspective view of a sealed contact incorporating two of the paramagnetic contacts illustrated in FIG. 2A;

FIG. 3 is an enlarged view taken along the line 3—3 of FIG. 1, illustrating the cross section of a first track employed in the apparatus;

FIG. 5 is an enlarged, fragmentary, elevation view, with parts broken away for the sake of clarity, of a detector incorporated in the apparatus of FIG. 1;

FIG. 6 is an enlarged view taken along the line 6—6 of FIG. 5;

FIG. 9 is an enlarged view taken along the line 9—9 of FIG. 1, illustrating the cross section of a second track employed in the apparatus thereof;

FIG. 10 is an enlarged, fragmentary, elevation view, with parts broken away for the sake of clarity, of an orienting station incorporated in the apparatus of FIG. 1 and employing an electromagnet;

FIGS. 11A and 11B are elevation views, with parts removed for the sake of clarity, illustrating the passage through the orienting station of oppositely oriented contacts; and FIG. 12 is a schematic diagram of an energization circuit for the electromagnet of the orienting station.

Figure 4:
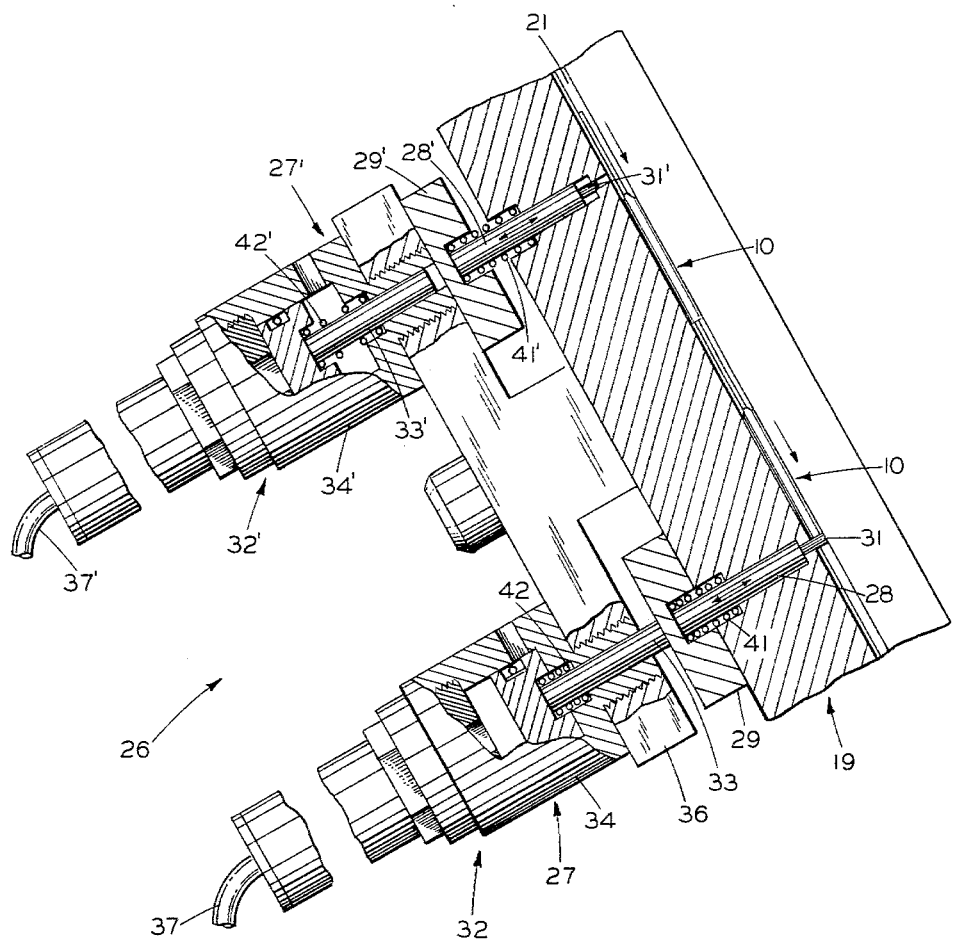
FIG. 4 is an enlarged, fragmentary, elevation view, with parts broken away for the sake of clarity, of an escapement mechanism incorporated in the apparatus of FIG. 1.

Referring now to the drawings, and particularly to FIG. 1, there is shown apparatus for orienting articles, such as contacts 10—10, having asymmetrically shaped ends. As more clearly seen in FIG. 2A, each contact has a cylindrical or "round" end 11 and a paddle-shaped or "flat" end 12. Additionally, each of the contacts 10—10 is composed of a paramagnetic material, by which is meant a material capable of experiencing attraction by a magnet and of altering the inductance of a coil to a sufficient degree for the purpose of this invention to be fulfilled. In the particular example, the material is "52 alloy," an alloy consisting of approximately 52 percent nickel and 48 percent iron. After being oriented, the

member 69, in turn, is fixedly connected to the shaft 71 of an air cylinder 72 which when actuated drives the pins 66—66 into the bores 67—67. The air cylinder 72 is supported by a U-shaped member 73 which is secured to the top plate 57.

Figure 7:
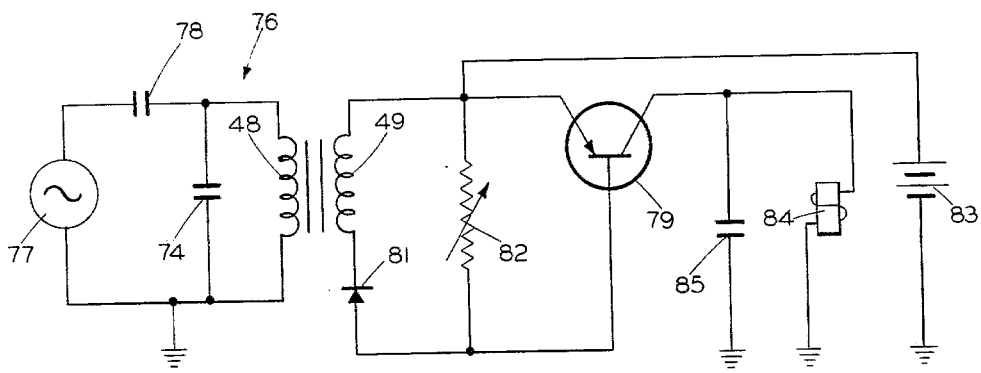
FIG. 7 is a schematic diagram of a circuit forming part of the detector.

Referring now in detail to the circuit of FIG. 7, the primary coil 48 of the coil unit 44 is connected in parallel with a capacitor 74 to form a tuned circuit 76, and the tuned circuit thus formed connected in a series circuit including an oscillator 77 and a capacitor 78. The secondary coil 49 is connected in the input circuit of a transistor amplifier 79. The input circuit of the transistor amplifier 79 additionally includes a rectifier diode 81 and a biasing resistor 82. D.C. bias voltage is applied to the transistor amplifier 79 by a suitable D.C. voltage source 83. The output circuit of the transistor amplifier 79 includes a relay 84 having a capacitor 85 connected in parallel therewith.

The capacitors 74 and 78 are selected such that the tuned circuit 76 is at resonance with the oscillator 77 when no contact 10 is within the primary coil 48. Accordingly, a relatively large signal at this time is inductively coupled to the secondary winding 49. This signal, after rectification by the diode 81, is applied to the input of the amplifier 79 which amplifies the signal and impresses it across the relay 84. The magnitude of the amplified signal is such as to cause energization of the relay 84. The relay 84 remains energized as long as no contact 10 is within the primary coil. When, however, a contact 10 is disposed within the coils 48 and 49, i.e., when a contact is positioned within the passageway 54 with its flat end 12 leading (FIG. 8A), the inductance thereof changes because of the paramagnetic nature of the contact, resulting in a detuning of the tuned circuit 76 with a concomitant decrease in the signal developed thereacross. This, in turn, results in a lowering of the input signal to the transistor amplifier 79 which, in turn, results in a lowering of the signal impressed across the relay 84 to a value insufficient to maintain energization thereof. Accordingly, the relay 84 deenergizes. Thus, it is seen that the condition of the detector relay 84 after a contact 10 is positioned in the passageway 54 indicates the initial orientation of the contact. As will be seen below, the detector relay 84 performs a control function in the subsequent orienting of the contacts 10—10.

After the detector 43 functions to detect which end of a contact 10 is leading, the jaws 53—53 are moved apart by the air cylinder 72 to release the contact for advancement down the track 63 which is provided with a channel 86 (best seen in FIG. 9) having relatively high side walls, for reasons which will become apparent from the following discussion.

*Orienting station*

Referring to FIG. 10, the released contact 10 proceeds down the track 63 to a suitable orienting station, designated generally by the numeral 87 which functions to reverse the orientation of the contact if the flat end 12 is leading. If the round end 11 of the contact 10 is leading, the contact passes through the orienting station 87 without a reversal of its orientation. The specific orienting station 87 to be described herein forms the subject matter of the related co-pending application of F. J. Brown, B. M. Eckhaus and N. F. Gubitose, Serial No. 430,814, filed on even date herewith and assigned to the assignee of the present application.

The orienting station 87 includes a horseshoe shaped electromagnet 88 having two poles 89 and 91. The magnet 88 is supported by a bracket 92 which is connected to the side of the track 63 by means of screws 93—93 which pass through the side of the track and through oval shaped openings 94—94 in the bracket. The openings 94—94 enable adjustment of the longitudinal position of the magnet 88 relative to the track 63. The magnet 88 is energizable by means of two windings 96 and 97 connected to each other so as to form one composite electrical coil 98 which is included in an energization circuit (FIG. 12) to be described in more detail below.

The base of the channel 86 has a step 99 therein in advance of the magnet 88. When a contact 10 reaches the step 99, it drops off the step and, because of gravity, partially pivots about its leading end. The height of the step 99, and the angle of inclination of the track 63 are such that the contact 10 will not completely pivot, but will retain its initial orientation as long as the magnet 88 is not energized (FIG. 11A). When, however, the magnet 88 is energized, developing a magnetic field and magnetizing the poles 89 and 91 with unlike polarity, the pole 89 nearest to the advancing contact 10 attracts the leading end thereof while the other pole 91 furthest from the contact attracts the lagging end thereof (FIG. 11B). Accordingly, the contact 10 pivots about its leading end in an end-for-end manner to a reverse orientation.

Referring now to the magnet energization circuit of FIG. 12, the coil 98 (which, as will be recalled, represents the two windings 96 and 97 in series) is connected in a series circuit which includes a source of D.C. power 101, a variable resistor 102 and a contact 103 of the detector output relay 84. A diode 104 is connected in parallel with the coil 98 for arc suppression purposes and a contact protection circuit including a resistor 106 and a capacitor 108 is connected across the contact 103.

Figure 8A:
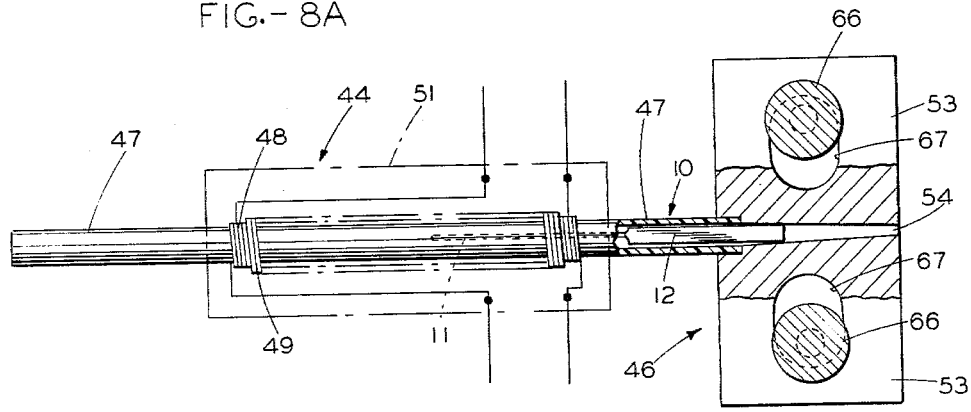
FIGS. 8A and 8B are enlarged views, taken along the line 8—8 of FIG. 6, with parts removed and broken away for the sake of clarity, illustrating how oppositely oriented contacts are positioned in the detector.
Figure 8B:
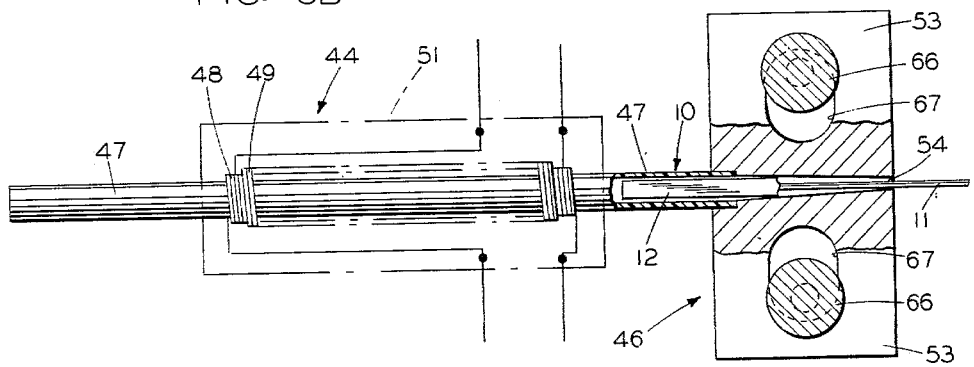

As is readily seen, the coil 98 (and, hence, the windings 96 and 97) is energized as long as the contact 103 is closed and is deenergized whenever the contact is open. It will be recalled that the detector output relay 84 (FIG. 7) remains energized (and hence the contact 103 open) as long as a contact 10 is not disposed within the coils 48 and 49. In this connection, it should be noted that the capacitor 85 in parallel with the relay 84 precludes the relay from being deenergized during the transit of a contact 10 through the tube 47 to the passageway 54 (FIGS. 8A and 8B). Accordingly, when a contact 10 having its round end 11 leading is released by the detector jaws 53—53, no energizing current is supplied to the windings 96 and 97 of the magnet 88 and, as seen in FIG. 11A, the contact 10 passes through the orienting station 87 without its orientation being disturbed.

When, however, a contact 10 having its flat end 12 is in the passageway 54 of the detector 43 (FIG. 8A), the detector relay 84 is deenergized closing the contact 103 and resulting in energizing current being supplied to the coil 98, to magnetize the poles 89 and 91. Accordingly, when the contact drops off the step it pivots (as seen in FIG. 11B) into the magnetic field resulting from the magnetized poles 89 and 91 and is reversed in an end-for-end manner so that its round end 11 is leading when the contact leaves the orienting station 87. It should be noted that the capacitor 85 prevents the relay 84 from immediately reenergizing when the contact 10 is released from the detector 43, the relay not reenergizing until the capacitor charges to the energization voltage of the relay. The capacitor 85 is selected such that it does not charge to this voltage until completion of the orientation of the contact.

Thus, as is seen, all of the contacts 10 leave the orienting station 87 with the same orientation, i.e., they all have their round ends leading. At the bottom of the track 63 the contacts enter a tube 109 which directs them to a suitable receptacle represented schematically by the block 111.

*Summary of operation*

The contacts 10—10 are deposited in random order in the bowl 16 and are fed up the track 17 thereof in a single file to the track 19. The contacts 10—10 then proceed by gravity down the track 19 to the escapement mechanism 26, the pins 28 and 28' of which are in the positions shown in FIG. 4. Accordingly, the advanceing on the amount of the article which is within the opening;

(b) means for halting the advancement of the article in a position such that, if one end of the article is leading, the article stops in a position with at least a portion of the article in the opening and the electrical parameter accordingly assumes a first value, and such that, if the other end of the article is leading, the article stops in a different position and the electrical parameter assumes a different value; and (c) means, responsive to the value of the parameter of the electrical unit, for generating a signal indicating the orientation of the article.

7. In apparatus having a track along which elongated paramagnetic articles having asymmetrically shaped ends are advanced single file, a detector for detecting which end of each article is leading, which detector comprises:

(a) an electrical coil disposed in the path of the articles;

(b) means for halting the advancement of each article such that, if one end of the article is leading, the article is halted in a position with at least a portion of the article within the coil, thereby changing the inductance thereof, and if the other end of the article is leading, the article is halted outside of the coil thereby not changing the inductance thereof; and (c) means including the coil for generating a signal in accordance with the inductance of the coil.

8. Apparatus according to claim 7 wherein:
the halting means includes a pair of normally closed, selectively operable jaws having opposed surfaces shaped so as to define a pasageway when the jaws are closed;
the passageway is dimensioned and the jaws are longitudinally positioned relative to the coil such that, if one end of an article is leading, the article is halted by striking the walls of the passageway with the major portion thereof being disposed within the coil, and if the other end of the article is leading, the article is halted within the passageway with no part thereof being disposed within the coil; and
means for opening the jaws after the orientation has been detected to release the article from the jaws.

9. Apparatus according to claim 7 wherein the signal generating means includes a tuned circuit having the coil as a component part thereof, the circuit being tuned or detuned depending on the amount of a halted article within the coil.

10. Apparatus in accordance with claim 9 wherein:
the tuned circuit is of the parallel resonant type;
the signal generating means further includes means for supplying current of the resonant frequency to the tuned circuit so that the voltage developed thereacross is of a first value when the circuit is tuned and is of a lower value when the circuit is detuned; and
means are provided, responsive to the voltage developed across the tuned circuit, for indicating the presence or non-presence of a contact within the coil.

11. In apparatus having a track along which elongated paramagnetic articles having asymmetrically shaped ends are advanced single file, a detector for detecting which end of each article is leading, which comprises:

(a) first and second concentric electrical coils disposed in the path of the articles;

(b) means for halting the advancement of each article such that, if one end of the article is leading, the article is halted in a position with at least a portion of the article within the coils, thereby changing the inductance thereof, and if the other end of the article is leading, the article is halted outside of the coils thereby not changing the inductance thereof;

(c) means for developing a voltage of one value across the first coil when a contact is disposed therewithin and for developing a voltage of a second value across the first coil when a contact is not disposed therewithin, the voltages developed across the first coil being inductively coupled to the second coil; and (d) means including the second coil and responsive to the voltages coupled thereto for indicating the presence or non-presence of a contact within the coils.

12. Apparatus for detecting the orientation of elongated paramagnetic articles having asymmetrically shaped ends, and for reversing the orientation of those articles detected to be in an undesirable orientation, which apparatus comprises:

(a) means for advancing the article in single file along a predetermined path;

(b) a detector for detecting the orientation of each article, the detector including
 (1) an electrical coil disposed in the path of the articles,
 (2) means for halting the advancement of each article such that, if one end of the article is leading, the article is halted in a position with at least a portion of the article within the coil, thereby changing the inductance thereof, and if the other end of the article is leading, the article is halted outside of the coil thereby not changing the inductance thereof,
 (3) means including the coil for generating a signal in accordance with the inductance of the coil to indicate the orientation of each article, and
 (4) means disposed along the predetermined path and responsive to the signal generating means for reversing the orientation of those articles determined by the detector to have an undesired orientation.

13. Apparatus according to claim 12 wherein:
the halting means includes a pair of normally closed, selectively operable jaws having opposed surfaces shaped so as to define a pasageway when the jaws are closed;
the passageway is dimensioned and the jaws are longitudinally positioned relative to the coil such that, if one end of the article is leading, the article is halted within the passageway with the major portion thereof being disposed within the coil to change the inductance thereof, and if the other end of the article is leading, the article is halted within the passageway with no part thereof being disposed within the coil thereby not to change the inductance of the coil; and
means are provided for opening the jaws after the orientation has been detected to release the article from the jaws.

14. Apparatus in accordance with claim 13 wherein:
the article advancing means includes first and second similarly inclined tracks having respective channels through which the articles are advanced;
the coil is disposed about a tube having one end in communication with the channel of the first track; and
the jaws are positioned such that the entrance end of the passageway is in communication with the other end of the coil tube, and the exit end of the passageway is in communication with the channel of the second track.

References Cited by the Examiner

UNITED STATES PATENTS

| | | | |
|---|---|---|---|
| 1,334,326 | 3/1920 | Strane | 221—171 |
| 2,823,781 | 2/1958 | Bosch | 193—43 |
| 2,863,588 | 12/1958 | Stover | 221—212 |
| 2,975,878 | 3/1961 | Cason | 193—43 |
| 3,115,235 | 12/1963 | Othon | 198—33 |
| 3,204,751 | 9/1965 | Durr | 198—33 |

ROBERT B. REEVES, *Primary Examiner.*

W. SOBIN, *Examiner.*